(12) United States Patent
Holland

(10) Patent No.: US 12,200,309 B1
(45) Date of Patent: Jan. 14, 2025

(54) SYSTEMS AND METHODS FOR SOCIAL MEDIA VIDEO STREAMING

(71) Applicant: Meta Platforms, Inc., Menlo Park, CA (US)

(72) Inventor: Jason Holland, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/937,299

(22) Filed: Sep. 30, 2022

(51) Int. Cl.
*H04N 21/482* (2011.01)
*H04L 65/61* (2022.01)

(52) U.S. Cl.
CPC ......... *H04N 21/4821* (2013.01); *H04L 65/61* (2022.05); *H04N 21/4828* (2013.01)

(58) Field of Classification Search
CPC . H04N 21/4821; H04N 21/61; H04N 21/4828
See application file for complete search history.

(56) References Cited

U.S. PATENT DOCUMENTS

| | | | |
|---|---|---|---|
| 2014/0164506 A1* | 6/2014 | Tesch | H04L 51/52 709/204 |
| 2014/0325568 A1* | 10/2014 | Hoang | H04N 21/235 725/87 |
| 2015/0181301 A1* | 6/2015 | Bloch | H04N 21/4532 725/41 |
| 2016/0277802 A1* | 9/2016 | Bernstein | H04N 21/44213 |
| 2018/0068019 A1* | 3/2018 | Novikoff | G06F 16/7867 |
| 2022/0317866 A1* | 10/2022 | Backor | G06F 3/0481 |
| 2023/0401634 A1* | 12/2023 | Wang | G06Q 30/0253 |

\* cited by examiner

*Primary Examiner* — Mulugeta Mengesha
(74) *Attorney, Agent, or Firm* — Greenberg Traurig, LLP

(57) ABSTRACT

Systems and methods for social media video streaming may include (1) presenting, within a short-form video being streamed as part of a short-form video feed, a selectable theme element, indicating a theme associated with the short-form video, (2) receiving user input selecting the selectable theme element, and (3) in response to receiving the user input, presenting a digest interface of short-form videos, relating to the theme, which includes (i) sets of tiles, in which each tile corresponds to a different short-form video, organized into subthemes, and (ii) a digital social engagement element, which provides an entry point for digital social engagement relating to the theme.

20 Claims, 9 Drawing Sheets

SYSTEMS AND METHODS FOR SOCIAL MEDIA VIDEO STREAMING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
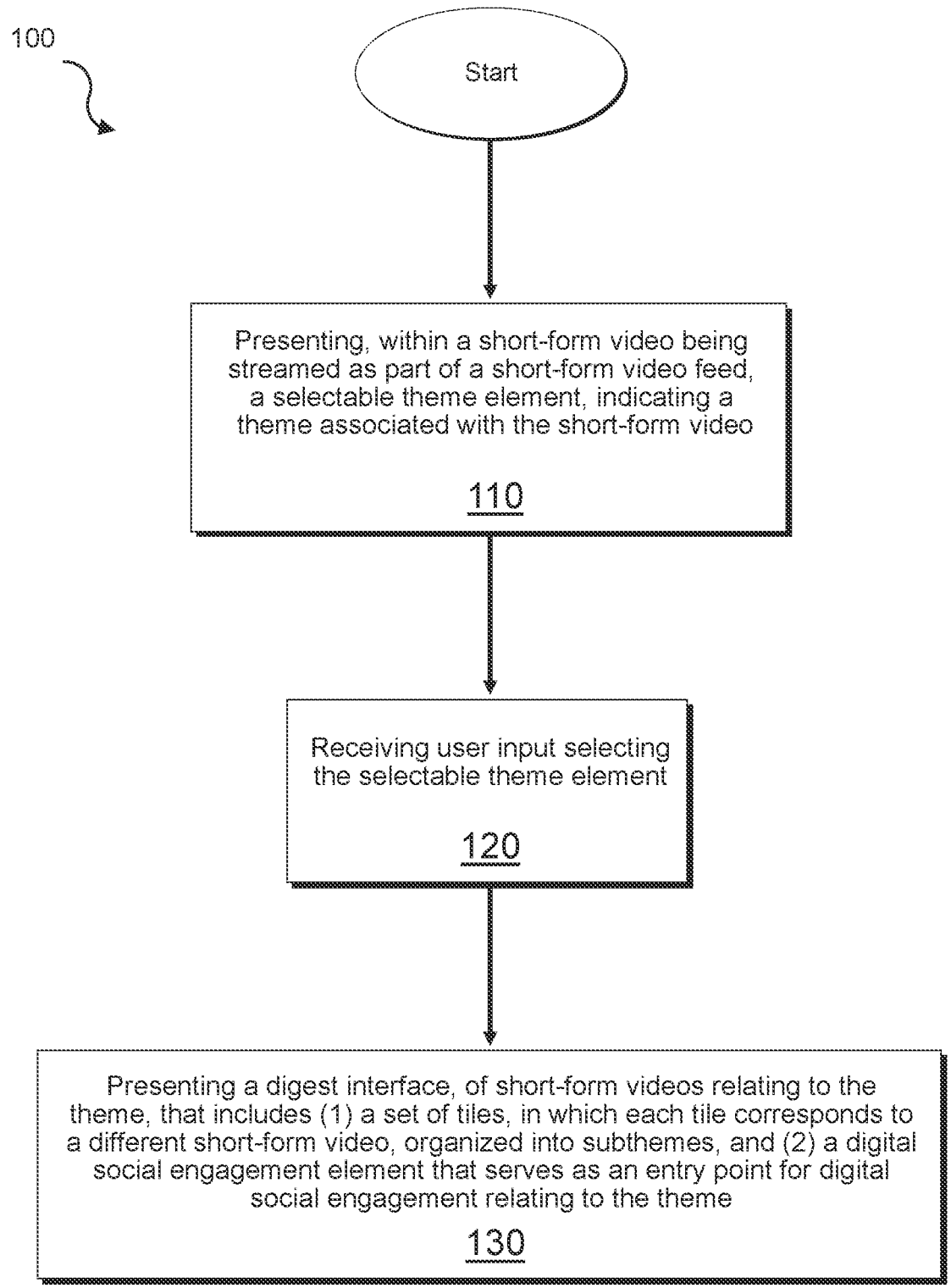
FIG. 1 is a flow diagram of an exemplary method for social media video streaming.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure identifies a need for a digital theme-based digest of short-form videos that relate to a theme (e.g., "Halloween"). In some examples, short-form videos displayed within the digital theme-based digest may be grouped together by subtheme (e.g., "Costumes"). The digital theme-based digest may additionally include one or more discussion pods (e.g., chat threads, polls, audio rooms, digital social groups, etc.) relating to the theme and/or an entry point for a digital collection of discussion pods relating to the theme. The digital theme-based digest may be accessible via a variety of digital entry points. In some examples, a short-form video relating to a particular theme (e.g., presented as part of a short-form video feed) may include a theme element. When selected, the theme element may navigate to a digital theme-based digest of short-form videos relating to the particular theme. Additionally or alternatively, a digital multi-theme center (e.g., a digital digest of themes) may include selectable visual representations of multiple themes that enable a user to browse themes and select a visual representation of a theme to view a corresponding digital theme-based digest for that theme.

The disclosed short-form video framework may enable digital access of content organized by theme together with enabling digital social connection relating to a theme. This may improve traditional short-form video feed frameworks that enable the consumption of short-form video content but are limited in their ability to enable digital social connection relating to the content. As will be explained in greater detail below, embodiments of the present disclosure may improve the field of short-form video streaming by improving a framework for socially sharing and consuming short-form videos relating to a theme. For example, embodiments of the present disclosure may improve data organization and may enable digital social connection (e.g., via digital social messaging pods) in the short-form video streaming context. The present disclosure may improve the functioning of a computer itself by improving data organization, data consumption, and data creation flows.

The following will provide, with reference to FIG. 1, detailed descriptions of computer-implemented methods for social media video streaming. Detailed descriptions of corresponding example systems will also be provided in connection with FIG. 2. Detailed descriptions of corresponding interfaces and embodiments will be provided in connection with FIGS. 3-9. FIG. 1 is a flow diagram of an exemplary computer-implemented method 100 for social media video streaming. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (associated with a user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a platform via an interface of the platform (e.g., text-based communication, video conferencing and/or audio conferencing, digital status broadcasting, public content posting and/or commenting, etc.). In some examples, server 202 may operate as part of and/or in connection with a social media service 208. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, user 206 of user device 204 may be a user (e.g., a member) of social media service 208. In these examples, user device 204 may have installed an instance of a social media application 210, which may operate as part of social media service 208 and through which one or more services provided by social media service 208 (e.g., via server 202) may be accessible. In some examples, social media application 210 may be dedicated to a single service. For example, social media application 210 may represent a dedicated short-form video application. In other examples, social media application 210 may provide access to multiple services (e.g., a combination of the digital newsfeed service, digital story service, digital messaging service, and/or digital short-form video service described below). In addition, or as an alternative, to enabling access to services of social media service 208 via social media application 210, user device 204 may have installed a browser that may navigate to one or more webpages through which the one or more services provided by social media service 208 (e.g., via server 202) may also be accessible.

Social media service 208 may provide a variety of services (e.g., platforms) for the users within its network (e.g., via server 202 and/or social media application 210). For example, social media service 208 may provide a newsfeed service. The term "newsfeed" may generally refer to any type or form of social media consumption channel that presents a scrollable collection of newsfeed posts. In some examples, a newsfeed may scroll (e.g., upward or downward) to reveal different posts within the newsfeed (e.g., in response to receiving user scrolling input). In one example, the scrollable collection may include newsfeed posts created by contacts of a particular user (e.g., friends of the particular user). In some examples, a particular user's newsfeed may be configured to include a combination of connected newsfeed posts (e.g., posts created by a contact of the particular user and/or by a user whom the particular user is following) and non-connected newsfeed posts (e.g., posts generated by users who are not contacts of the particular user and/or who are not being followed by the particular user). In some such examples, a newsfeed may be configured to include a determined ratio, or a ratio within a determined range of ratios, of connected to non-connected newsfeed posts.

Figure 3:
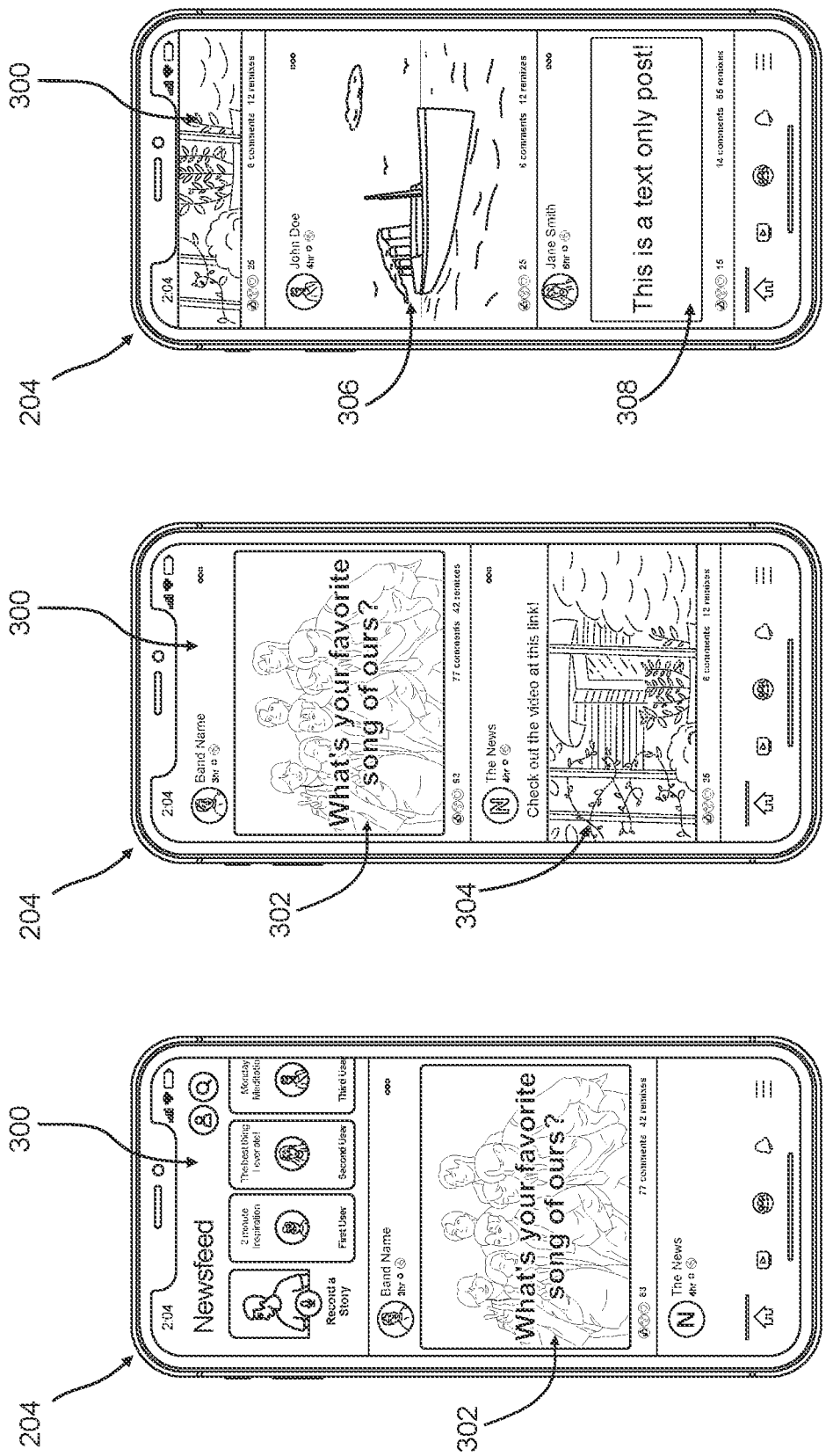
FIG. 3 is an illustration of an exemplary newsfeed interface.

The term "newsfeed post" generally refers to any type or form of digital composition that may be displayed in a newsfeed (e.g., that is configured for display within a newsfeed). Newsfeed posts may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes a combination newsfeed post 302 with an image and text, a link-based newsfeed post 304, a video-based newsfeed post 306, and a text-based newsfeed post 308. In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, location information, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed within the viewing pane (e.g., over the primary content), above the viewing pane, beneath the viewing pane, and/or may be otherwise visually associated with newsfeed post. The newsfeed service may enable viewers of a newsfeed post to respond to the newsfeed post in a variety of ways. In some examples, a newsfeed interface may enable a user to comment on a newsfeed post, via a text, image, and/or video-based reply, and may create a digital thread of comments corresponding to the newsfeed post (e.g., displayed beneath the newsfeed post and/or accessible via a comments affordance).

Figure 4:
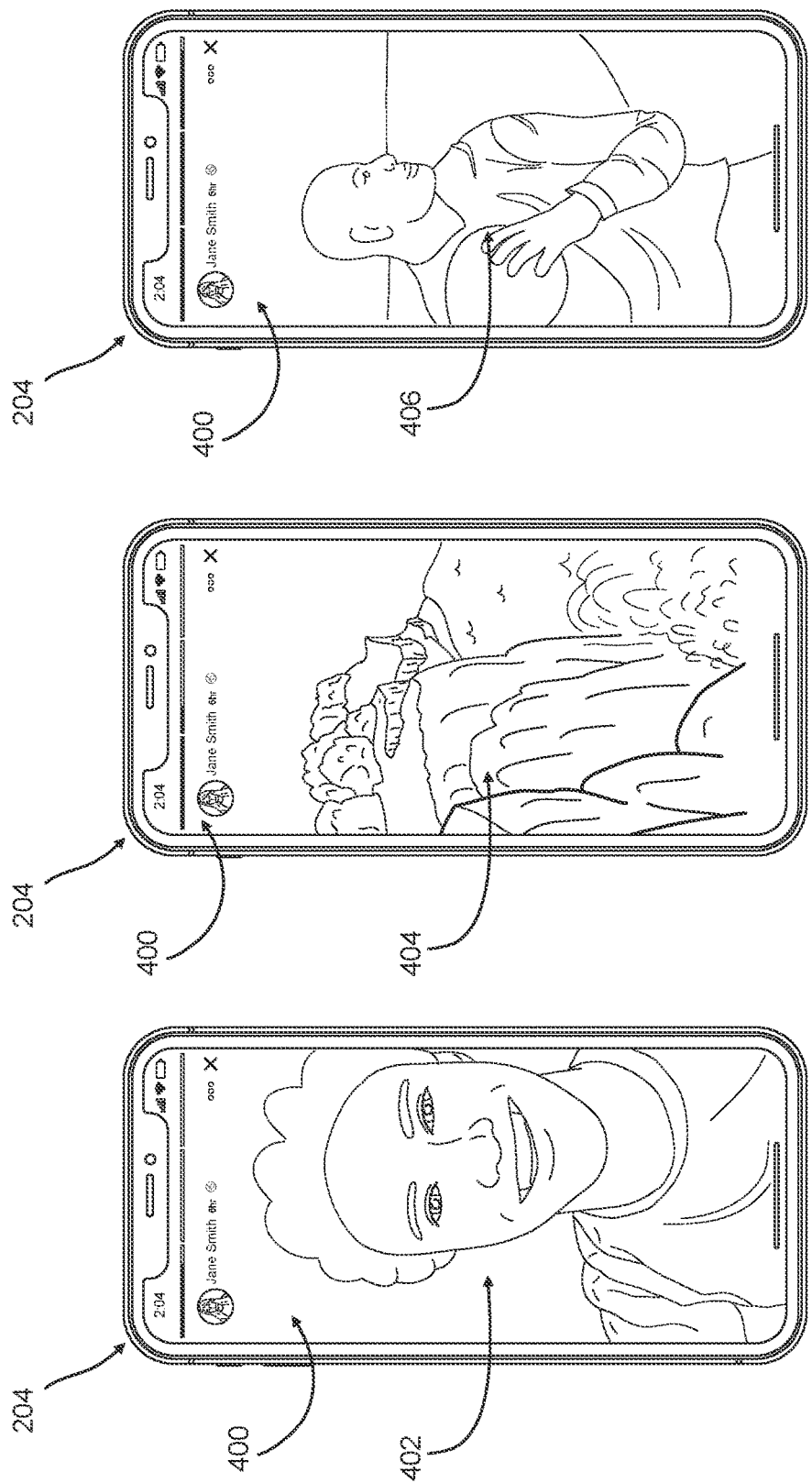
FIG. 4 is an illustration of an exemplary stories feed interface.

As another example, social media service 208 may provide a digital story service. The digital story service may provide users with a story consumption channel, which presents a continuous series of digital story posts to a story-consumer, one by one (e.g., in a slideshow format). The term "digital story post" may generally refer to any type or form of social media post intended (e.g., configured) for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from the same source (e.g., created and/or posted by the same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. FIG. 4 depicts an exemplary story interface 400 showing digital story posts 402, 404, and 406 of a user's digital story. Similar to the newsfeed service, the digital story service may enable viewers of a story post to comment on the post, via a text and/or image-based reply and/or reply story, creating a digital thread of comments. Similar to the newsfeed service, a stories service may configure a story feed for a particular user that includes connected content (e.g., story posts created by users who are contacts of the particular user or being followed by the particular user), non-connected content, or a determined ratio of connected content to non-connected content.

Figure 5:
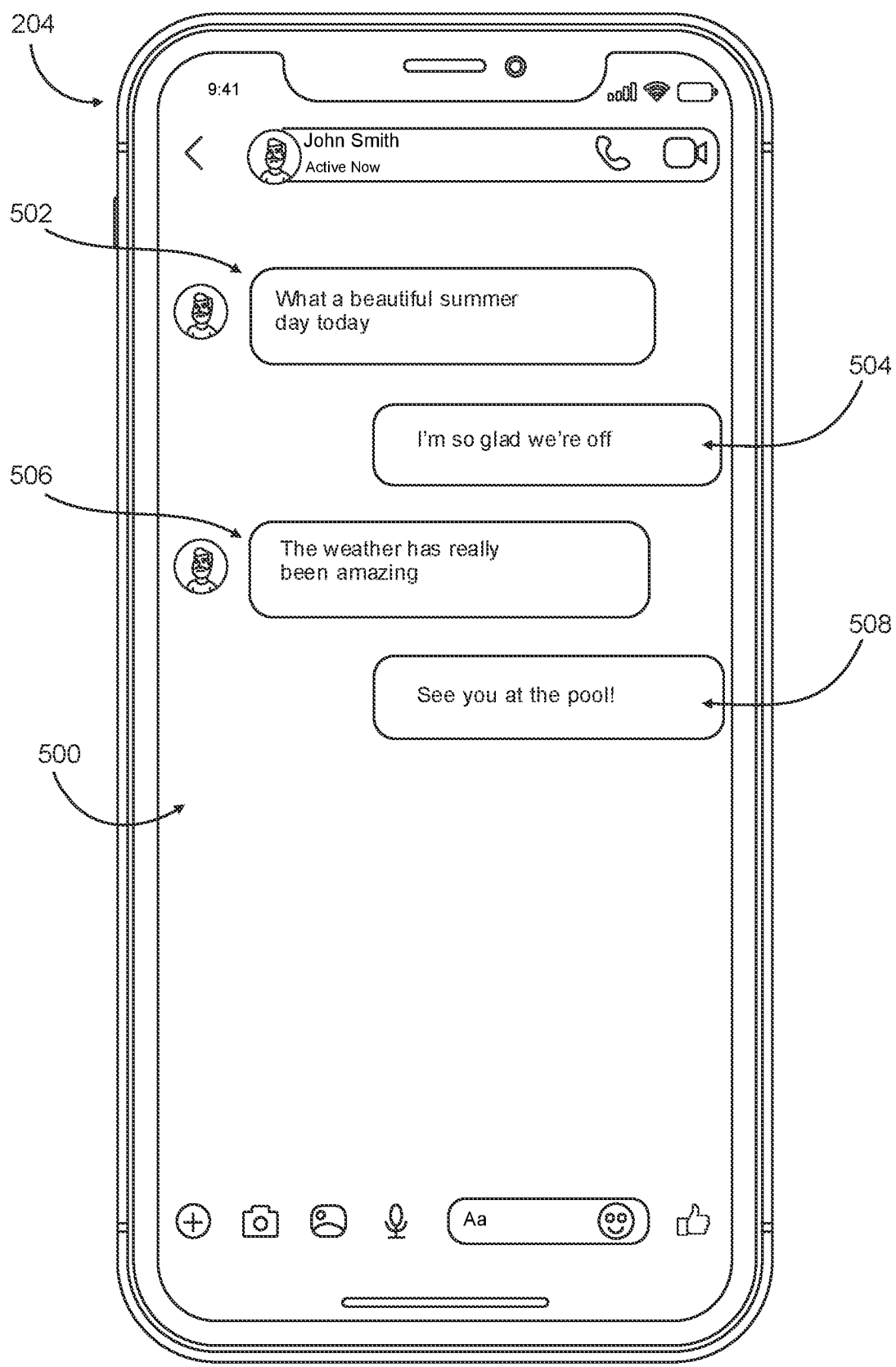
FIG. 5 is an illustration of an exemplary messaging interface.

As another example, social media service 208 may provide a messaging service. The term "messaging service" may generally refer to any type or form of digital message delivery system that enables users of social media service 208 to exchange messages (e.g., text messages, audio messages, and/or video messages). FIG. 5 depicts an exemplary messaging interface 500 showing digital message posts 502, 504, 506, and 508 of a digital messaging thread.

In some examples, social media service 208 may provide a short-form video service (e.g., a reels service) that enables users to create short-form videos and/or consume (e.g., watch and/or digitally respond to) short-form videos created by other users. In one embodiment, social media service 208 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., thirty seconds or less in length).

The term "short-form video feed" may generally refer to a series (e.g., a queue) of short-form videos (e.g., selected for a particular user) that social media application 210 (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In one embodiment, the short-form video feed may be configured to only play pre-recorded short-form videos. Additionally or alternatively, a short-form video feed may be configured to play live short-form videos. In some examples, short-form videos may be continuously added to a user's short-form video feed as the short-form videos of the feed are consumed (e.g., such that a determined number of short-form videos are always in queue to be played).

Figure 6:
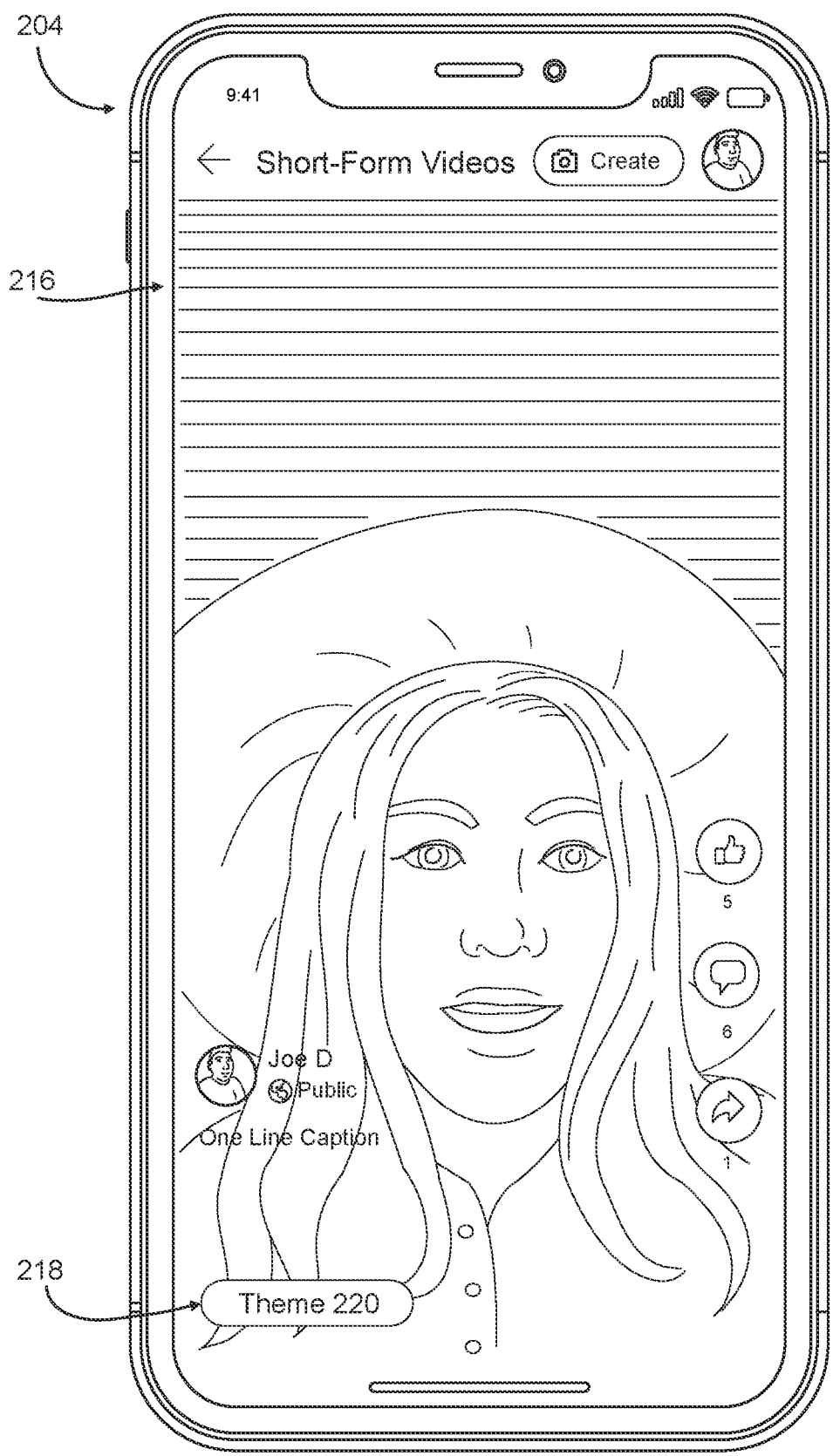
FIG. 6 is an illustration of an exemplary short-form video feed interface.

In some examples, a short-form video feed may be presented via a dedicated short-form video feed interface. In certain embodiments, short-form videos selected for a short-form video feed may be changed (and/or an order in which short-form videos are presented may be changed) each time the short-form video feed interface is refreshed. A short-form video feed interface may be refreshed in response to a variety of triggers (e.g., each time a user accesses the feed, each time the user digitally initiates a refresh action, in response to scrolling input, at designated intervals, etc.). FIG. 6 depicts an exemplary dedicated short-form video feed interface presenting a short-form video. In some examples, as mentioned previously and as depicted in FIG. 6, short-form videos may be presented one by one as a continuous series of short-form videos (e.g., in a slideshow format). In other examples, multiple short-form videos may be displayed at once in a short-form video digest (e.g., via a full-screen digest of short-form video tiles, each corresponding to a different short-form video, or via a strip of short-form video tiles). In such examples, content from a short-form video may be configured to play in a loop within the short-form video's video tile. In some examples, a short-form video feed may be streamed via another platform of social media service 208. For example, a short-form video feed may be displayed via a short-form video strip in a newsfeed of a newsfeed service and/or a story tile within a story feed of social media service 208.

Short-form videos may be selected for the short-form video feed of a particular user based on a variety of metrics. For example, a short-form video may be selected based on a topic the short-form video has been tagged with in response to a determination that the particular user is interested in and/or predicted to be interested in the topic (e.g., based on usage history and/or demographic information submitted by the user). As another example, a short-form video may be selected based on a user who created the short-form video (e.g., in response to a determination that the particular user is following the creator-user and/or is predicted to be interested in content posted by the creator-user). As another example, a short-form video may be selected based on a popularity of the short-form video.

In some examples, a short-form video feed may be thought of (e.g., configured) as a framework that exclusively and/or primarily provides users with non-connected content and/or that provides a user with a combination of non-connected content and content created by content-creators that the user is following. In contrast, a newsfeed and/or stories feed may be thought of (e.g., configured) as a framework that primarily provides its users with connected content or that provides users with a combination of connected and non-connected content. In some examples, a newsfeed and/or stories feed may be configured to include a determined ratio of connected to non-connected content in which connected content is favored over non-connected content (e.g., more connected content is included than non-connected content). By contrast, a short-form video feed may be configured to include only non-connected content or to include a determined ratio of non-connected content to content created by content-creators a particular user is following.

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

In examples in which social media service 208 provides a variety of services, social media service 208 may integrate across the services. For example, an order in which the discussion pods of the short-form video service, discussed below in connections with steps 110-130, are displayed may be based, in part, on contact information and/or usage data from one of the other services provided by social media service 208. For example, in a short-form video interface configured for a particular user, a discussion pod created by and/or joined by a user account that is connected to the user (e.g., a user account that is designated as a contact of the user and/or that has posted content that has been liked by the user) in another service may be presented above a discussion pod that is not connected to the particular user in another service.

As another example, an entry point for the theme-based digital digests discussed below may be provided within a newsfeed and/or a stories feed. For example, the disclosed systems may (1) identify a topic of a newsfeed post and/or a stories feed post, (2) determine that the topic corresponds to a theme for which a theme-based digital digest has been created within the short-from video service, and (3) enable access to the theme-based digital digest via the newsfeed post and/or the stories feed post. In this example, the access to the theme-based digital digest may be provided in a variety of ways. For example, the disclosed systems may provide a selectable element, which navigates to the theme-based digital digest, in association with the newsfeed post and/or stories feed post (e.g., within the post, beneath the post, above the post, within a menu accessible via the post, etc.). As another example, the disclosed systems may provide a strip of short-form videos relating to the theme (e.g., beneath the post), which may also include a link to the theme-based digital digest.

Figure 2:
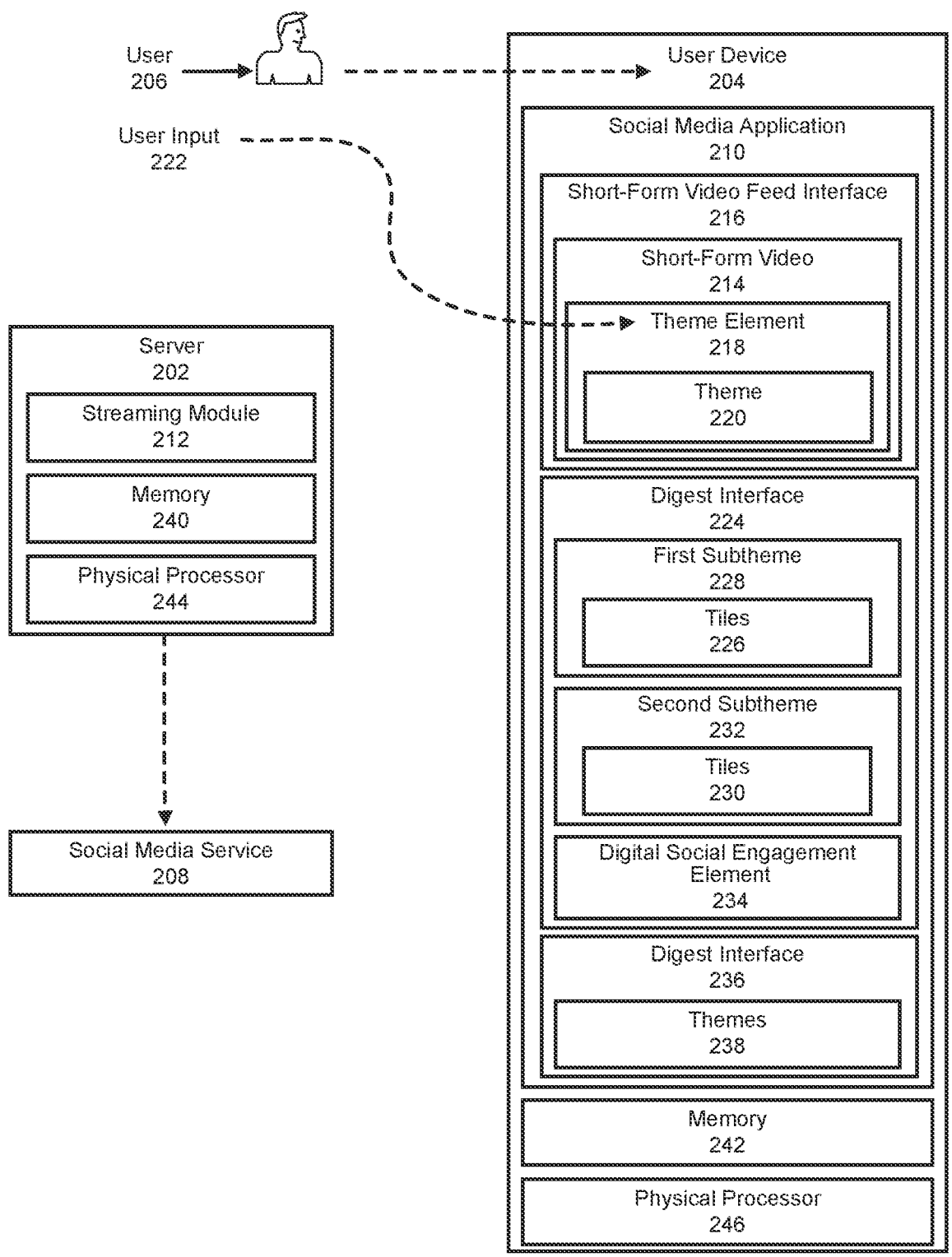
FIG. 2 is a block diagram of an exemplary system for social media video streaming.

Returning to FIG. 1, at step 110, one or more of the systems described herein may present, within a short-form video being streamed as part of a short-form video feed, a selectable theme element, indicating a theme associated with the short-form video. For example, as illustrated in FIG. 2, a streaming module 212 may present, within a short-form video 214 being streamed as part of a short-form video feed within a short-form video feed interface 216, a selectable theme element 218, indicating a theme 220 associated with short-form video 214.

Theme 220 may generally represent any type or form of theme (e.g., any topic, concept, subject, entity, object, issue, and/or idea). Examples of theme 220 include, without limitation, an interest (e.g., parenting, fashion and beauty, a hobby, and/or a sport), a holiday (e.g., Halloween), a product, a location, an establishment (e.g., a restaurant and/or a university), a philosophy, a person, and/or a group. In some examples, themes accessible via a short-form video streaming platform of social media service 208 may be platform-generated (e.g., platform-initiated). In such examples, a theme may be created manually (e.g., by an employee of the short-form video streaming platform) and/or automatically (e.g., by a machine learning algorithm and/or based on usage data such as data indicating trending topics being viewed via the short-form video streaming platform). Additionally or alternatively, a theme may be created for the short-form video streaming platform by an end user of the short-form video streaming platform. In these examples, the short-form video streaming platform may enable users to create new themes (e.g., as will be described in greater detail below following the discussion of step 130).

Short-form video 214 may generally represent any type or form of short-form video configured for a short-form video streaming platform (e.g., with any of the features of a short-form video described above in connection with FIG. 2). FIG. 6 provides an exemplary depiction of short-form video 214 according to one embodiment. As shown in FIG. 6, short-form video 214 may include selectable theme element 218. Selectable theme element 218 may generally represent any type or form of graphical user element that may be selected via user input and, when selected, navigates to a theme-based digest interface corresponding to a theme indicated by selectable theme element 218. Selectable theme element 218 may take any visual form (e.g., may be presented in any shape, color, etc.) and may be presented anywhere within short-form video feed interface 216 in visual association with short-form video 214. In some examples, selectable theme element 218 may include a text-based descriptor of theme 220.

In certain embodiments, selectable theme element 218 may include an animated graphic designed to draw attention to selectable theme element 218. For example, selectable theme element 218 may take a particular form (e.g., an ovular form as depicted in FIG. 6) and the animated graphic may represent a ribbon, a length of which is shorter than a length of the perimeter of the form, that is configured to move around the perimeter of the form (e.g., like a train moving around an ovular train track). In some such examples, the ribbon may be configured to change colors as it moves around the perimeter of the form. In one embodiment, the ribbon may include a range of colors that rotate from one end of the ribbon to the other as the ribbon moves around the perimeter of the form.

Returning to FIG. 1, at step 120, one or more of the systems described herein may receive user input selecting the selectable theme element. For example, as illustrated in FIG. 2, streaming module 212 may receive user input 222 selecting selectable theme element 218. Streaming module 212 may receive user input 222 in a variety of ways. In examples in which streaming module 212 operates within a backend server, streaming module 212 may receive an indication of user input 222 from user device 204. Additionally or alternatively, in examples in which streaming module 212 operates within user device 204, streaming module 212 may receive user input 222 to user device 204 directly (e.g., via tapping input to a screen of user device 204 and/or input to an auxiliary device such as a digital mouse).

In response to receiving the user input, one or more of the systems described herein may, at step 130, present a digital digest interface, of short-form videos relating to the theme, that includes (1) a set of tiles, each tile corresponding to a different short-form video, organized into multiple subthemes and (2), a digital social engagement element that serves as an entry point for digital social engagement relating to the theme. For example, as illustrated in FIG. 2, streaming module 212 may present digest interface 224. Digest interface 224 may organize multiple sets (e.g., series) of tiles by subtheme of theme 220 (e.g., digest interface 224 may have grouped together a first set of tiles 226 corresponding to a first subtheme 228 of theme 220 and a second set of tiles 230 corresponding to a second subtheme 232 of theme 220).

Digest interface 224 may organize tiles into any type or form of subtheme relating to theme 220. A subtheme may represent any type or form of theme (e.g., topic, concept, subject, entity, object, issue, and/or idea) that relates to theme 220. In some examples, a subtheme may correspond to a particular content creator (e.g., may include a series of short-form videos relating to theme 220 created by a particular content creator). In some examples, a subtheme may correspond to a particular topic relating to theme 220. For example, in an embodiment in which theme 220 represents the holiday "Halloween," digest interface 224 may include, as a subtheme, a series of short-form videos relating to Halloween costumes and/or a series of short-form videos that are based on a Halloween-themed song. In some examples, a subtheme may correspond to a filter (e.g., may include a series of short-form videos to which a particular filter has been applied). For example, in an embodiment in which theme 220 represents the holiday "Valentine's Day," digest interface 224 may include, as a subtheme, a series of short-form videos to which a filter, relating to Valentine's Day, has been applied (e.g., a pink or red tint, an augmented reality element of falling hearts, etc.).

Figure 7:
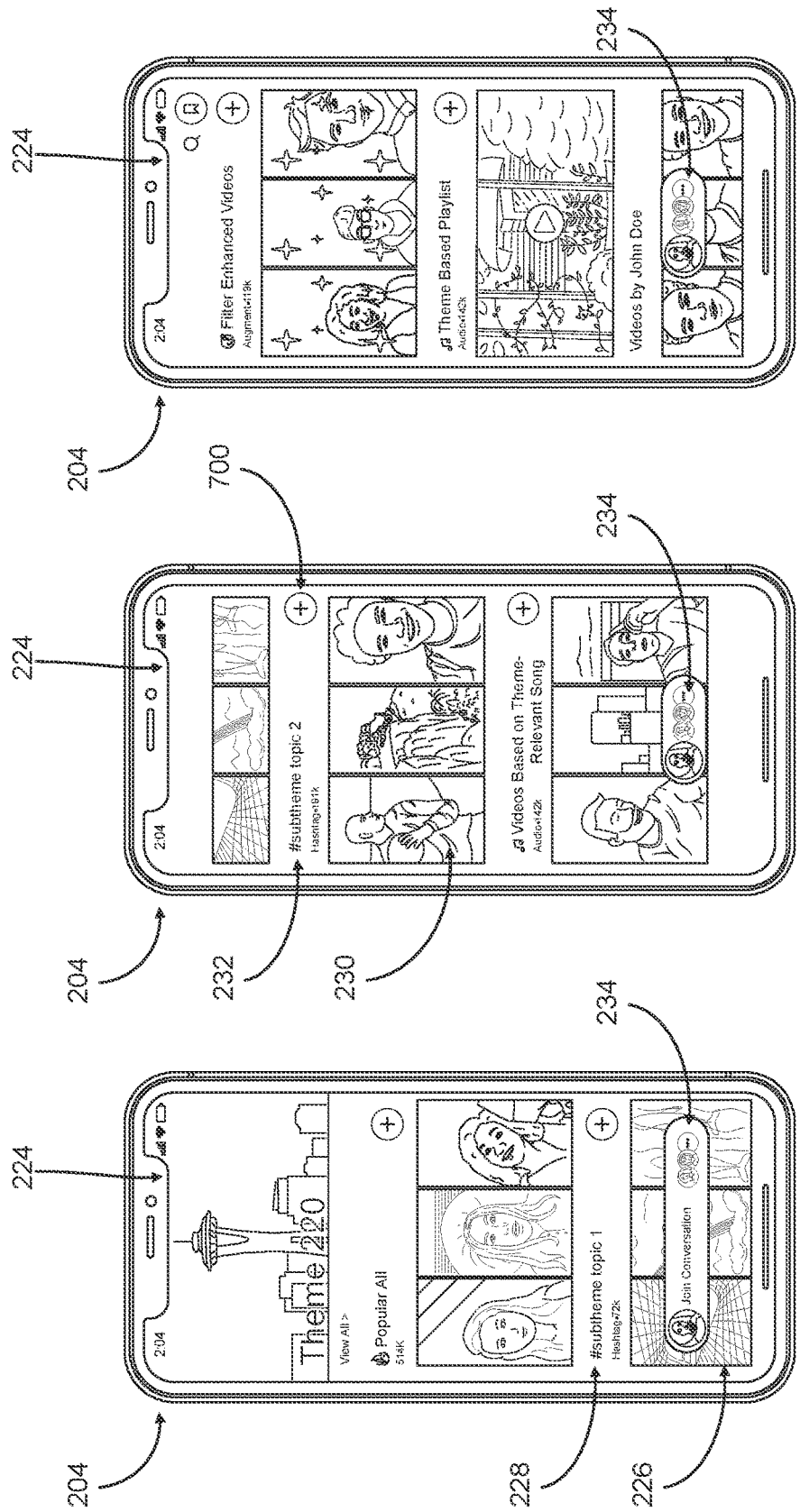
FIG. 7 is an illustration of an exemplary digest interface of short-form videos relating to a theme.

In some examples, digest interface 224 may be configured to (1) vertically scroll between each of the subthemes presented within digest interface 224 and (2) horizontally scroll between the short-form videos of each subtheme. In some such examples, (1) the tiles of short-form videos corresponding to a subtheme may be organized in a horizontally scrollable strip presented beneath a text-based designator indicating the subtheme and (2) digest interface 224 may enable vertical scrolling between the horizontally scrollable strips of different subthemes. FIG. 7 provides an exemplary depiction of digest interface 224 in which (1) horizontally scrollable strips of short-form videos are provided beneath text-based designators indicating a subtheme and (2) a user may vertically scroll between the different strips of short-form videos and text-based designators. In some examples, as depicted in FIG. 7, an entry point (e.g., element 700) for creating a short-form video relating to a subtheme may be provided within digest interface 224 (e.g., in association with a horizontally scrollable strip of short-form videos relating to the subtheme and/or a text-based designator indicating the subtheme). In such examples, streaming module 212 may further (1) receive additional user input selecting the entry point for creating a new short-form video relating to the subtheme and (2) in response to receiving the additional user input, provide one or more creation interfaces to enable the creation of a new short-form video relating to the subtheme. Once a new short-form video is created via the one or more creation interfaces, streaming module 212 may add a tile corresponding to the new short-form video to the relevant horizontally scrollable strip. Additionally or alternatively, digest interface 224 may include a new-subtheme creation element that, when selected via user input from a user, initiates the creation of an additional subtheme for digest interface 224. Thus, digest interface 224 may both (1) provide access to the short-form videos of previously created subthemes and (2) enable the creation of new short-form videos and/or new subthemes.

In some examples, digest interface 224 may include a variety of additional content relating to theme 220 (e.g., in addition to the series of short-form videos organized by subtheme). For example, digest interface 224 may include a music-based and/or video-based playlist corresponding to theme 220 and/or to a subtheme of theme 220, an entry point for joining a digital group relating to theme 220 (e.g., a digital chat room, a digital videoconferencing room, a digital audioconferencing room, and/or a digital watch party room for synchronous remote video viewing), an entry point for commerce relating to theme 220, etc. In some such examples, the additional content relating to theme 220 may be organized within the vertically scrollable structure described above (e.g., such that a user vertically scrolls between a strip of subtheme-based short-form videos followed by an entry point for consuming a playlist relating to theme 220, etc.).

In addition to displaying scrollable content (e.g., short-form videos organized by subtheme), digest interface 224 may also include a digital social engagement element 234, which may represent an entry point for digital social engagement relating to theme 220. In some examples, the scrollable content (e.g., the short-form videos) may represent non-connected content (e.g., content that is not created by a contact of the user to whom the content is being presented). By providing an entry point for digital social engagement within a theme-based digital digest, the disclosed systems and methods may provide a digital interface that enables the consumption of non-connected content (e.g., content that entertains, motivates, etc.) and that also enables digital social connection centering around a theme. In certain examples, digest interface 224 may be primarily directed to providing consumable media content (e.g., video content and/or audio content) and digital social engagement element 234 may navigate to digital social engagement that is primarily text-based. In other examples, both digest interface 224 and content accessible via digital social engagement element 234 may include a combination of media-based content and text-based content.

Figure 8:
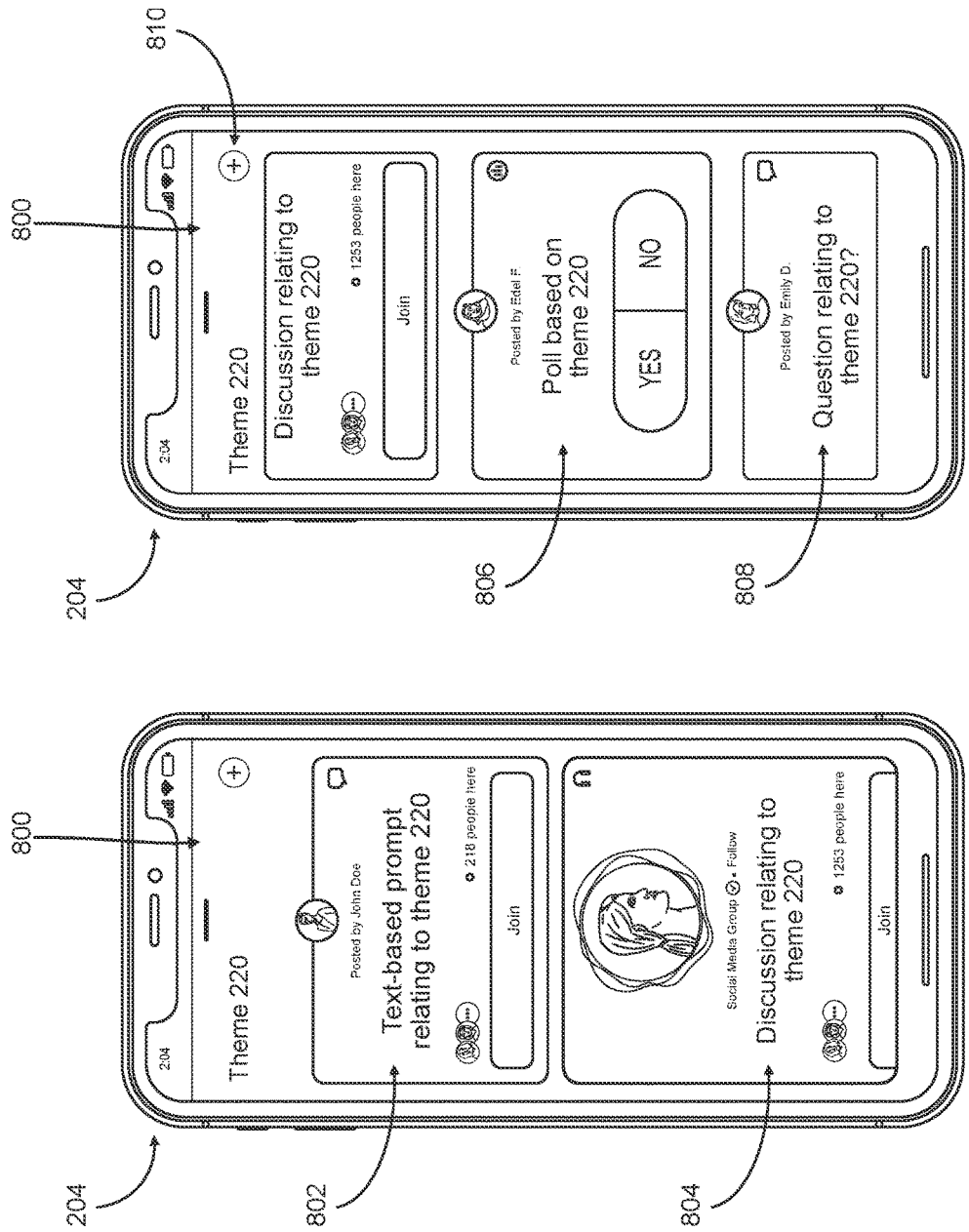
FIG. 8 is an illustration of an exemplary social engagement digest interface, accessible via the digest interface depicted in FIG. 7, of social engagement pods relating to a theme.

In response to receiving additional user input selecting digital social engagement element 234, streaming module 212 may present an additional digest interface of digital social engagement pods. The term "digital social engagement pod" may generally represent any type or form of digital container that stores a set of digital social engagements relating to theme 220. In some examples, a digital social engagement pod may represent a digital messaging thread, a poll, a digital discussion group, an audio room, and/or a video room. FIG. 8 provides an exemplary depiction of an additional digest interface 800 that includes a series of vertically scrollable digital social engagement pods 802, 804, 806, and 808.

In some examples, digital social engagement pods may be automatically generated (e.g., based on one or more inputs to a machine learning network). Additionally or alternatively, digital social engagement pods may be user generated. In some examples, as depicted in FIG. 8, a digital social engagement interface may include a creation element (e.g., element 810) for creating a new digital social engagement pod. In one such example, a creation flow for creating a new digital social engagement pod may enable a user to select the type of pod (e.g., a poll, a discussion group, etc.) and may configure the resulting digital social engagement pod based on the selection to include features corresponding to the selected type of pod. For example, a selection of a poll pod type may result in a creation flow that enables a user to input a question and a resulting digital social engagement pod may enable viewer voting. As another example, a selection of a discussion group pod type may result in a digital social engagement pod that includes a joinable group messaging thread. As another example, a selection of a video room pod type may result in a digital social engagement pod that includes a joinable video conferencing room. In some examples, digital social engagement pods may be included within digest interface 224 (in addition to or instead of being accessible via a separate social engagement interface).

Figure 9:
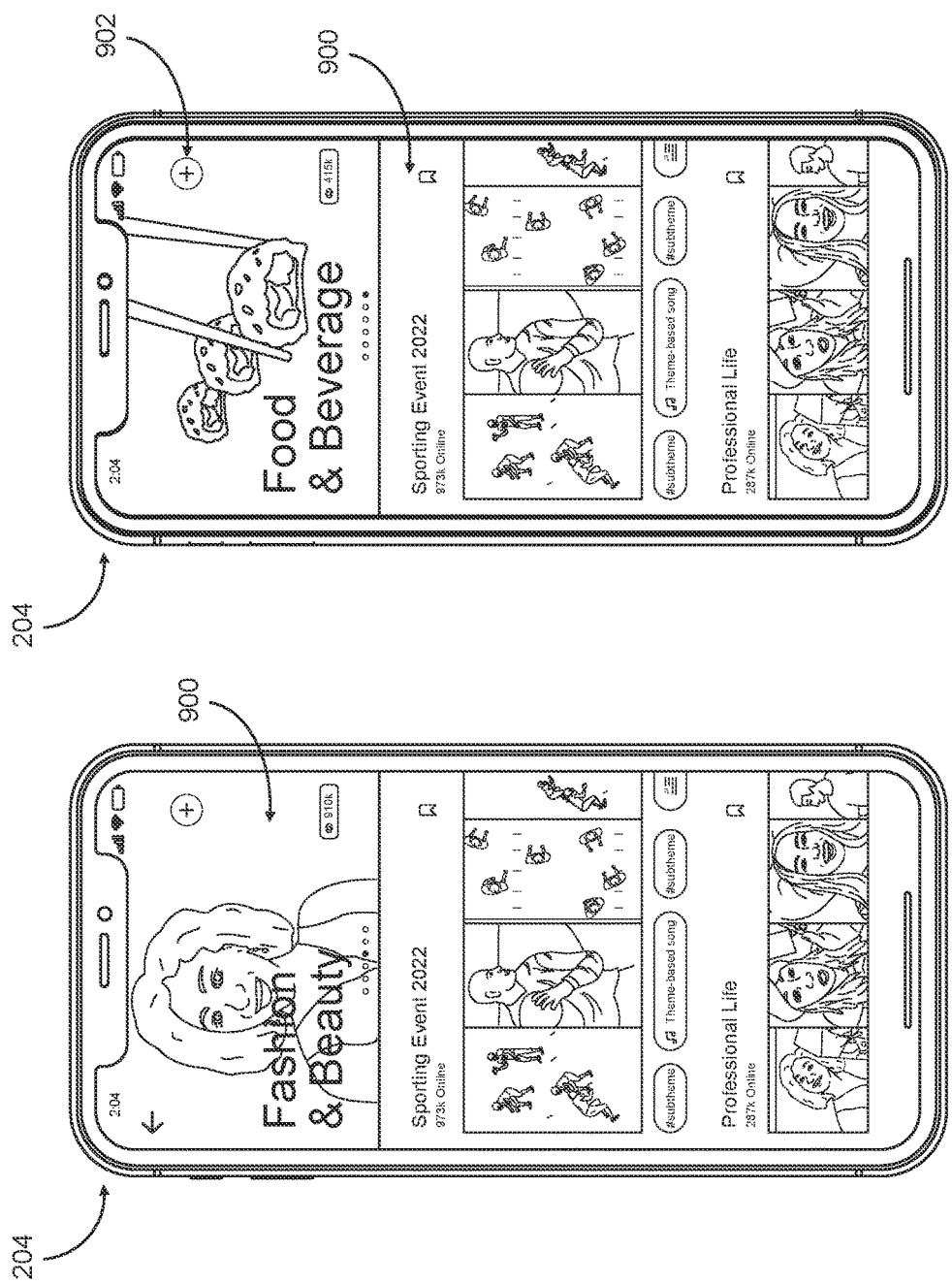
FIG. 9 is an illustration of a digest interface of short-form video themes.

In some examples, a catalog of multiple different themes may be provided within a theme digest interface (e.g., an additional digest interface 236 may provide a catalog of themes 238). In these examples, the theme digest interface may include entry points for the different themes depicted within the theme digest interface. For example, each theme may be represented by a selectable tile that, when selected, navigates to a theme-based digital digest interface associated with the theme represented by the tile. FIG. 9 provides an exemplary depiction of a theme digest interface 900. In some examples, a theme digest interface may include a new-theme creation element (e.g., element 902 in FIG. 9) that, when selected via user input from a user, initiates the creation of an additional digest interface of short-form videos relating to a new theme selected by the user. In these examples, the theme digest interface may both serve as an entry point for accessing digest interfaces corresponding to existing themes and serve as an entry point for the creation of digest interfaces corresponding to new themes.

Example Embodiments

Example 1: A computer-implemented method may include (1) presenting, within a short-form video being streamed as part of a short-form video feed, a selectable theme element, indicating a theme associated with the short-form video, (2) receiving user input selecting the selectable theme element, and (3) in response to receiving the user input, presenting a digest interface of short-form videos, relating to the theme, which includes (i) sets of tiles, each tile corresponding to a different short-form video, organized into subthemes, and (ii) a digital social engagement element, which provides an entry point for digital social engagement relating to the theme.

Example 2: The computer-implemented method of example 1, where the subthemes include (1) short-form videos with a particular filter, (2) short-form videos created by a particular content creator, and/or (3) short-form videos corresponding to a particular topic relating to the theme.

Example 3: The computer-implemented method of examples 1-2, where the digest interface is configured to (1) vertically scroll between the plurality of subthemes and (2) horizontally scroll between the short-form videos of each subtheme.

Example 4: The computer-implemented method of example 3, where the tiles of short-form videos corresponding to a subtheme are organized in a horizontally scrollable strip presented beneath a text-based designator indicating the subtheme.

Example 5: The computer-implemented method of example 4, where the method further includes presenting, in association with the horizontally scrollable strip and/or the text-based designator, an entry point for creating a short-form video relating to the subtheme.

Example 6: The computer-implemented method of example 5, where the method further includes (1) receiving additional user input selecting the entry point for creating a new short-form video relating to the subtheme, (2) in response to receiving the additional user input, providing one or more creation interfaces to enable the creation of a new short-form video, and (3) adding a tile corresponding to a resulting new short-form video, created via the one or more creation interfaces, to the horizontally scrollable strip.

Example 7: The computer-implemented method of examples 1-6, where the digest interface further includes (1) a playlist corresponding to the theme and/or a subtheme of the theme and/or (2) an entry point for joining a digital group relating to the theme.

Example 8: The computer-implemented method of examples 1-7, where the method further includes (1) receiving additional user input selecting the digital social engagement element and (2) in response to receiving the additional user input, presenting an additional digest interface of digital social engagement pods.

Example 9: The computer-implemented method of example 8, where the digital social engagement pods include a digital messaging thread, a poll, a digital discussion group, an audio room, and/or a video room.

Example 10: The computer-implemented method of examples 1-9, where the method further includes providing an additional digest interface with entry points for multiple different themes.

Example 11: The computer-implemented method of example 10, where the method further includes providing, within the additional digest interface, a new-theme creation element that, when selected via user input from a user, initiates the creation of an additional digest interface of short-form videos relating to a new theme selected by the user.

Example 12: The computer-implemented method of examples 1-11, where the method further includes providing, within the digest interface, a new-subtheme creation element that, when selected via user input from a user, initiates the creation of an additional subtheme selected by the user for the digest interface.

Example 13: A system for implementing the above-described method may include at least one physical processor and physical memory that includes computer-executable instructions that, when executed by the physical processor, cause the physical processor to (1) present, within a short-form video being streamed as part of a short-form video feed, a selectable theme element, indicating a theme associated with the short-form video, (2) receive user input selecting the selectable theme element, and (3) in response to receiving the user input, present a digest interface of short-form videos, relating to the theme, which includes (i) sets of tiles, each tile corresponding to a different short-form video, organized into subthemes, and (ii) a digital social engagement element, which provides an entry point for digital social engagement relating to the theme.

Example 14: The system of example 13, where the subthemes include (1) short-form videos with a particular filter, (2) short-form videos created by a particular content creator, and/or (3) short-form videos corresponding to a particular topic relating to the theme.

Example 15: The system of examples 13-14, where the digest interface is configured to (1) vertically scroll between the plurality of subthemes and (2) horizontally scroll between the short-form videos of each subtheme.

Example 16: The system of example 15, where the tiles of short-form videos corresponding to a subtheme are organized in a horizontally scrollable strip presented beneath a text-based designator indicating the subtheme.

Example 17: The system of example 16, where the computer-executable instructions further cause the physical processor to present, in association with at least one of the horizontally scrollable strip or the text-based designator, an entry point for creating a short-form video relating to the subtheme.

Example 18: The system of example 17, where the computer-executable instructions further cause the physical processor to (1) receive additional user input selecting the entry point for creating a new short-form video relating to the subtheme, (2) in response to receiving the additional user input, provide one or more creation interfaces to enable the creation of a new short-form video and (3) add a tile corresponding to a resulting new short-form video, created via the one or more creation interfaces, to the horizontally scrollable strip.

Example 19: The system of examples 13-18, where the digest further includes 91) a playlist corresponding to the theme and/or a subtheme of the theme and/or (2) an entry point for joining a digital group relating to the theme.

Example 20: A non-transitory computer-readable medium may include one or more computer-readable instructions that, when executed by at least one processor of a computing device, cause the computing device to (1) present, within a short-form video being streamed as part of a short-form video feed, a selectable theme element, indicating a theme associated with the short-form video, (2) receive user input selecting the selectable theme element, and (3) in response to receiving the user input, present a digest interface of short-form videos, relating to the theme, which includes (i) sets of tiles, each tile corresponding to a different short-form video, organized into subthemes, and (ii) a digital social engagement element, which provides an entry point for digital social engagement relating to the theme.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 240 and 242 in FIG. 2) and at least one physical processor (e.g., physical processor 244 and 246 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   streaming a short-form video as part of a short-form video feed, wherein the short-form video feed streams short-form videos one by one as a continuous series;
   presenting, within the short-form video as the short-form video is streaming, a selectable topic element, indicating a topic associated with the short-form video;
   receiving, via user input as the short-form video is streaming, a selection of the selectable topic element; and
   in response to receiving the selection of the selectable topic element presented within the short-form video as the short-form video is streaming, presenting a digest interface of short-form videos relating to the topic, wherein the digest interface, presented in response to the selection of the selectable topic element, comprises both (1) a plurality of tiles, each corresponding to a different short-form video relating to the topic, organized into a plurality of subtopics, and (2) a digital social engagement element comprising an entry point for joining a digital discussion group relating to the topic.

2. The computer-implemented method of claim 1, wherein the plurality of subtopics comprises at least one of:
   short-form videos with a particular filter;
   short-form videos created by a particular content creator; or
   short-form videos corresponding to a particular topic relating to the topic.

3. The computer-implemented method of claim 1, wherein the digest interface is configured to (1) vertically scroll between the plurality of subtopics and (2) horizontally scroll between the short-form videos of each subtopic.

4. The computer-implemented method of claim 3, wherein the tiles of short-form videos corresponding to a subtopic are organized in a horizontally scrollable strip presented beneath a text-based designator indicating the subtopic.

5. The computer-implemented method of claim 4, further comprising presenting, in association with at least one of the horizontally scrollable strip or the text-based designator, an entry point for creating a short-form video relating to the subtopic.

6. The computer-implemented method of claim 5, further comprising:
   receiving additional user input selecting the entry point for creating a new short-form video relating to the subtopic;
   in response to receiving the additional user input, providing one or more creation interfaces to enable the creation of a new short-form video; and
   adding a tile corresponding to a resulting new short-form video, created via the one or more creation interfaces, to the horizontally scrollable strip.

7. The computer-implemented method of claim 1, wherein the digest interface further comprises at least one of:
   a playlist corresponding to at least one of the topic or a subtopic of the topic; or
   an entry point for joining a digital group relating to the topic.

8. The computer-implemented method of claim 1, further comprising:
   receiving additional user input selecting the digital social engagement element; and
   in response to receiving the additional user input, presenting an additional digest interface of digital discussion groups relating to the topic.

9. The computer-implemented method of claim 8, wherein the digital discussion groups comprise at least one of:
   a digital messaging thread;
   a group poll;
   a digital discussion group;
   a digital social group;
   a digital watch party room;
   a digital chat room;
   an audio room; or
   a video room.

10. The computer-implemented method of claim 1, further comprising providing an additional digest interface comprising entry points for a plurality of different topics.

11. The computer-implemented method of claim 10, further comprising providing, within the additional digest interface, a new-topic creation element that, when selected via user input from a user, initiates the creation of an additional digest interface of short-form videos relating to a new topic selected by the user.

12. The computer-implemented method of claim 1, further comprising providing, within the digest interface, a new-subtopic creation element that, when selected via user input from a user, initiates the creation of an additional subtopic selected by the user for the digest interface.

13. A system comprising:
   at least one physical processor;
   physical memory comprising computer-executable instructions that, when executed by the physical processor, cause the physical processor to:
      stream a short-form video as part of a short-form video feed, wherein the short-form video feed streams short-form videos one by one as a continuous series;
      present, within the short-form video as the short-form video is streaming, a selectable topic element, indicating a topic associated with the short-form video;
      receive, via user input as the short-form video is streaming, a selection of the selectable topic element; and
      in response to receiving the selection of the selectable topic element presented within the short-form video as the short-form video is streaming, present a digest interface of short-form videos relating to the topic, wherein the digest interface, presented in response to the selection of the selectable topic element, comprises both (1) a plurality of tiles, each corresponding to a different short-form video relating to the topic, organized into a plurality of subtopics, and (2) a digital social engagement element comprising an entry point for joining a digital discussion group relating to the topic.

14. The system of claim 13, wherein the plurality of subtopics comprises at least one of:
   short-form videos with a particular filter;
   short-form videos created by a particular content creator; or
   short-form videos corresponding to a particular topic relating to the topic.

15. The system of claim 13, wherein the digest interface is configured to (1) vertically scroll between the plurality of subtopics and (2) horizontally scroll between the short-form videos of each subtopic.

16. The system of claim 15, wherein the tiles of short-form videos corresponding to a subtopic are organized in a horizontally scrollable strip presented beneath a text-based designator indicating the subtopic.

17. The system of claim 16, wherein the computer-executable instructions further cause the physical processor to present, in association with at least one of the horizontally scrollable strip or the text-based designator, an entry point for creating a short-form video relating to the subtopic.

18. The system of claim 17, wherein the computer-executable instructions further cause the physical processor to:
   receive additional user input selecting the entry point for creating a new short-form video relating to the subtopic;
   in response to receiving the additional user input, provide one or more creation interfaces to enable the creation of a new short-form video; and
   add a tile corresponding to a resulting new short-form video, created via the one or more creation interfaces, to the horizontally scrollable strip.

19. The system of claim 13, wherein the digest interface further comprises at least one of:
   a playlist corresponding to at least one of the topic or a subtopic of the topic; or
   an entry point for joining a digital group relating to the topic.

20. A non-transitory computer-readable medium comprising one or more computer-readable instructions that, when executed by at least one processor of a computing device, cause the computing device to:
   stream a short-form video as part of a short-form video feed, wherein the short-form video feed streams short-form videos one by one as a continuous series;
   present, within the short-form video as the short-form video is streaming, a selectable topic element, indicating a topic associated with the short-form video;
   receive, via user input as the short-form video is streaming, a selection of the selectable topic element; and
   in response to receiving the selection of the selectable topic element presented within the short-form video as the short-form video is streaming, present a digest interface of short-form videos relating to the topic, wherein the digest interface, presented in response to the selection of the selectable topic element, comprises both (1) a plurality of tiles, each corresponding to a different short-form video relating to the topic, organized into a plurality of subtopics, and (2) a digital social engagement element comprising an entry point for joining a digital discussion group relating to the topic.

* * * * *